United States Patent

Walsh et al.

Patent Number: 6,112,770
Date of Patent: Sep. 5, 2000

[54] FLEXIBLE PROTECTIVE SLEEVE

[75] Inventors: Melanie Jane Walsh, Northants; Sarah Clare Paynter, Moreton Morrell, both of United Kingdom; Francis B. Fatato, Exton; Lee H. Martin, West Chester, both of Pa.

[73] Assignee: T&N Technology Limited, Rugby, United Kingdom

[21] Appl. No.: 09/094,162

[22] Filed: Jun. 9, 1998

[30] Foreign Application Priority Data

Jun. 28, 1997 [GB] United Kingdom .................. 9713598

[51] Int. Cl.[7] ...................................... F16L 57/00
[52] U.S. Cl. .................. 138/110; 138/108; 138/112; 138/113
[58] Field of Search ................ 138/110, 108, 138/112, 113, 116

[56] References Cited

U.S. PATENT DOCUMENTS

| | | | |
|---|---|---|---|
| 2,551,710 | 5/1951 | Slaughter | 138/113 |
| 3,240,233 | 3/1966 | Johnston | 138/108 |
| 3,581,776 | 6/1971 | Sheahan | 138/108 |
| 3,758,701 | 9/1973 | Schmidt | 138/113 |
| 4,501,302 | 2/1985 | Harwood | 138/113 |
| 4,688,890 | 8/1987 | DeMeo et al. | 138/108 |
| 4,906,496 | 3/1990 | Hosono et al. | 138/113 |
| 5,433,252 | 7/1995 | Wolf et al. | 138/113 |
| 5,497,809 | 3/1996 | Wolf | 138/148 |
| 5,829,485 | 11/1998 | Fatato et al. | 138/121 |

FOREIGN PATENT DOCUMENTS

| | | |
|---|---|---|
| 648357 | 1/1951 | United Kingdom . |
| 653855 | 5/1951 | United Kingdom . |
| 894490 | 4/1962 | United Kingdom . |
| 949567 | 2/1964 | United Kingdom . |
| 985241 | 3/1965 | United Kingdom . |
| 1413397 | 11/1975 | United Kingdom . |

*Primary Examiner*—James F. Hook
*Attorney, Agent, or Firm*—Synnestvedt & Lechner LLP

[57] ABSTRACT

A flexible protective sleeve (10; 20) for use in protecting an elongated member (W). The sleeve comprises a generally tubular wall (12; 22) for at least substantially surrounding the member. The sleeve also comprises resiliently-deformable projections (16; 24) projecting from an inner surface (18; 26) of the wall, the projections being arranged so that they cushion relative movement between the member and the wall.

10 Claims, 1 Drawing Sheet

FLEXIBLE PROTECTIVE SLEEVE

This invention is concerned with a flexible protective sleeve for use in protecting an elongated member, such as a wire, a bundle of wires, or a pipe. Such sleeves, conventionally, are long in relation to their width, ie at least three times the width depending on the length to be protected. Such sleeves comprise a generally tubular wall for at least substantially surrounding the member. For example, the wall may have the form of a hollow cylinder.

Conventionally, flexible protective sleeves are used for protecting wires or pipes from contact with other components to avoid undesirable noise generation and/or abrasion damage. Accordingly, the wall of such a sleeve is made from abrasion resistant non-resilient material. Such sleeves may also incidently act to insulate a member from heat or to protect other components from heat from the elongated member, the wall in these cases is made from heat-resistant material. Such sleeves are used, for example, in the engine compartments of vehicle.

In order for such sleeves to be able to accommodate themselves to curvature of the protected member, the wall of such a sleeve comprises portions or members which are movable relative to one another to accommodate curvature of the sleeve. Thus, the wall of a sleeve of this type may be formed from sheet material, eg plastics material such as nylon. The sheet material may be formed into a convoluted tube, the convolutions being movable relative to one another to accommodate curvature moving apart on the outside of a curve and together on the inside of a curve. In another possibility, the wall of a sleeve of this type may be formed from filaments or yarns of, for example, plastics material such as nylon, polyester or polypropylene. The filaments or yarns are formed into a sheet by a textile operation such as braiding, weaving or knitting. Glass fibre and other organic and inorganic fibres can also be used. The wall can be formed as a tube or as a flat sheet which is subsequently wrapped around into a tubular form. The filaments or yarns are movable relative to one another, moving closer together or farther apart, to accommodate curvature of the sleeve.

Some flexible protective sleeves have a longitudinal slit in their wall to enable the sleeve to be installed over a pipe or wire which is already in situ.

A conventional flexible protective sleeve is a relatively loose fit over an elongated member. This can be advantageous in, for example, situations where thermal insulation is an issue but has the disadvantage is that the sleeve may rattle on the elongated member causing undesirable noise. Another disadvantage is that the sleeve can become displaced along the member in service so that it may not be appropriately positioned to perform its function.

The problem of reducing noise from such sleeves has been considered in EP 0 556 140 B where the proposed solution is to cover the wall of the sleeve with a strip of sound-insulating material, eg felt, which is adhered to the wall. The strip covers the inner surface of the wall and would cushion impacts between the wall of the sleeve and the elongated member. However, the process of applying the strip of material is complex and the strip does not prevent the sleeve from becoming displaced along the member.

It is an object of the present invention to provide a flexible protective sleeve which overcomes the disadvantages mentioned above.

The invention provides a flexible protective sleeve for use in protecting an elongated member, the sleeve being long in relation to its width, the sleeve comprising a generally tubular wall for at least substantially surrounding the member, wherein the sleeve also comprises resiliently-deformable projections projecting from an inner surface of the wall, the projections being positioned at intervals along the inner surface of said wall, each projection being arranged so that it acts to cushion relative movement between the member and the wall.

In a sleeve according to the invention, the projections cushion relative movement between the elongated member and the wall, thereby preventing noise-generating impacts. The projections can also be arranged to press the elongated member either between projections on opposite sides of the member or between a projection and the wall, thereby gripping the member and acting to prevent the sleeve from being displaced along the member. Furthermore, the projections can be arranged to hold the wall out of contact with the member. This has an advantage, in situations where thermal insulation is an issue, as the insulating effect is improved by the member being held out of contact with the wall whereas, in conventional sleeves, the wall is supported by contact with the member.

In a sleeve according to the invention, the projections may be integral with the wall. For example, they may be provided as projections from filaments forming the wall. In one method for achieving this, plastics monofilaments are formed by the double needle bar process (used for forming eg hospital mattresses or helmet interiors) into two knitted sheets joined by filaments that run between the sheets, normally of each sheet; these filaments are cut through halfway between the sheets; and each sheet is rolled into a tubular form with the filaments on the inside and forming said projections.

Alternatively, the projections may be adhered to the wall. For example, a sheet of material to form the wall may have a supporting sheet which supports the projections adhered thereto before being rolled into tubular form with the projections on the inside. Possible supporting sheets are woven or knitted fabrics. In one possibility, the supporting sheet is made of foam having integral foam projections (a suitable material is "profile-cut" foam used in the packaging industry).

The projections may take many forms. For example, they may be long and thin so that they are resiliently-deformable by being bent out of a their unloaded configuration. For example, the projections may be plastics monofilaments, eg of polyester or nylon, having a diameter of 2.5 mm to 0.1 mm. The monofilaments may have the form of a hook, ie their free ends may be turned over through 90° or more. Alternatively, the projections may be made to be compressible lengthwise, eg they may take the form of columns, cones or pyramids made, eg, from elastomeric material, eg silicone rubber, or resilient foam. A loop of plastics monofilament with both its ends secured to or integral with the wall can form a lengthwise compressible projection.

The projections may have a grip-enhancing coating thereon or their tips may be enlarged to increase grip.

The projections may be uniformly distributed circumferentially of the sleeve, for example the projections may be uniformly distributed over the entire inner surface of the wall. Another possibility is for the projections to be arranged in groups at intervals along the sleeve, for example the wall of the sleeve may be convoluted and the projections may be located on the portions of the inner surface which have the smallest diameter. Another possibility is for the projections to follow a helical path along the sleeve. The number of projections per unit length of sleeve varies with the form of projection and the application in which the sleeve is to be used.

The projections may project normally of the inner surface of the wall or may be inclined along the sleeve to improve the grip on the sleeve. Some of the projections may be inclined in one direction along the sleeve while others are inclined in the opposite direction. In one possibility, the projections are arranged in rings with the direction of inclination alternating between successive rings.

The projections may project from the inner surface of the wall by at least 10%, eg 30%, of the width of the space surrounded by the wall. In some cases, this projection is 50% or more of said width so that the projections mingle with one another at the centre of the sleeve. Preferably, no member can be introduced into the sleeve without deforming the projections.

There now follow detailed descriptions, to be read with reference to the accompanying drawings, of two flexible protective sleeves which are illustrative of the invention.

Figure 3:
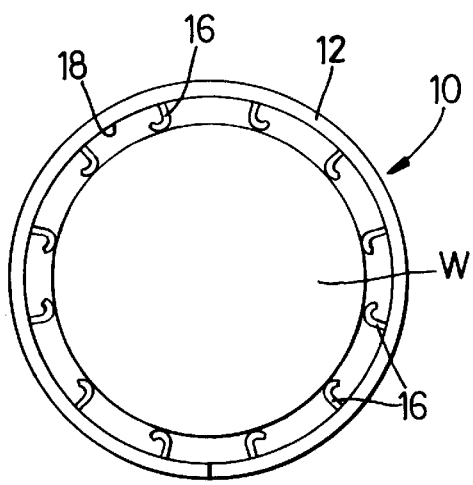
FIG. 3 is a view similar to FIG. 1 but showing an elongated member within the first illustrative sleeve.

The first illustrative flexible protective sleeve 10 is for use in protecting an elongated member, eg the wire W shown in FIG. 3. The sleeve 10 is long in relation to its width, being 2 cms in diameter and more than 30 cms long. The sleeve 10 comprises a generally tubular wall 12 for surrounding the wire W. The wall 12 is formed from polyester monofilaments 14 having a diameter of approximately 0.5 mm. To form the wall 12, the monofilaments 14 are knitted into a sheet and the sheet is rolled into the form of a hollow cylinder.

The sleeve 10 also comprises resiliently-deformable projections 16 projecting from an inner surface 18 of the wall 12. The projections 16 are positioned at intervals along the inner surface 18 and are arranged so that they act to cushion relative movement between the wire W and the wall 12, thereby preventing noise from impacts therebetween.

The projections 16 are in the form of cylindrical monofilaments of polyester projecting from and integral with some of the monofilaments 14 forming the wall 12. Thus, the projections are integral with the wall 12. Each projection 16 extends normally of the surface 18 towards the centre of the sleeve 10. The projections 16 are uniformly distributed over the surface 18, both circumferentially about the centre of the sleeve 10 and along the sleeve, so that they press on the wire W gripping it and centralising it within the wall 12.

Figure 1:
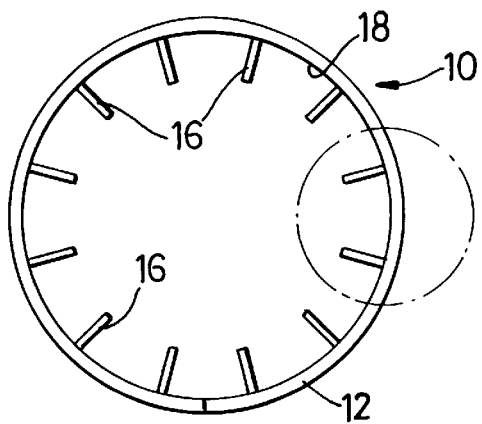
FIG. 1 is a diagrammatic end view of the first illustrative sleeve, showing the sleeve empty.
Figure 2:
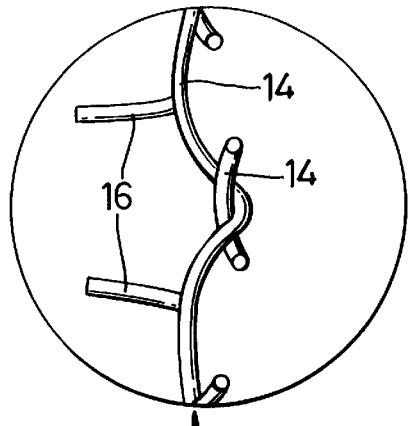
FIG. 2 is an enlarged view of the portion of FIG. 1 contained in a circle.

In their unloaded configuration (shown in FIG. 1), the projections 16 extend straight towards the centre of the sleeve 10, the projections 16 having their inner ends nearer to the centre of the sleeve 10 than the radius of the wire W. However, the projections 16 are resiliently-deformable by being bent out of their unloaded configuration. Thus, as shown in FIG. 3, introduction of the wire W into the interior of the sleeve 10 bends the projections 16 out of their unloaded condition. In this bent condition, each projection presses on the wire W and, as the projections 16 are evenly distributed around the wire W, the wire W is centralised in the sleeve 10 by the sleeve moving to a position relative to the wire in which the forces applied by the projections 16 to the wire are balanced.

Figure 4:
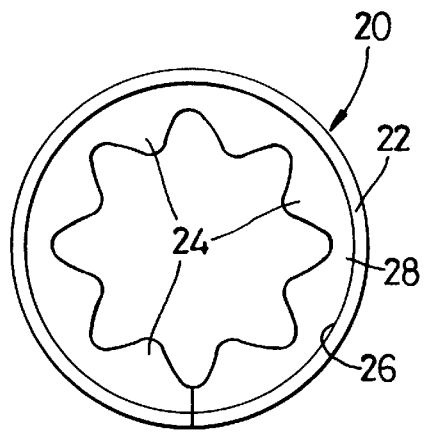
FIG. 4 is a view similar to FIG. 1 but of the second illustrative sleeve.

The second illustrative sleeve 20 shown in FIG. 4 is also a flexible protective sleeve for use in protecting an elongated member and is long in relation to its width. The sleeve 20 comprises a generally tubular wall 22 for at least substantially surrounding the member. The wall 22 is formed from continuous nylon sheet which is extruded in a cylindrical form and is convoluted to make it flexible. The sleeve 22 also comprises resiliently-deformable projections 24 projecting from an inner surface 26 of the wall. The projections 24 are formed from polyurethane foam and are in the form of mounds having a generally sinusoidal cross-section in both the circumferential and longitudinal directions of the sleeve. The projections 24 are, thus, positioned at intervals along the inner surface 26. The projections 24 are integral with a supporting sheet 28, also formed from foam, which is adhered to the surface 26 of said wall 22. Being formed from foam, the projections 24 are resiliently-deformable by being compressible lengthwise, ie towards the surface 26. The projections 24 are uniformly distributed over the surface 26 so that they are arranged so that, when they are deformed by a member surrounded by the wall 22, they cushion relative movement between the member and the wall. The projections 24 also press on the member and thereby act to grip the member and to centralise the member within the wall.

We claim:

1. A flexible protective sleeve for use in protecting an elongated member, the sleeve being long in relation to its width, the sleeve comprising a generally tubular wall for at least substantially surrounding the member, said wall being formed from abrasion-resistant non-resilient material, the wall having portions or members which are movable relative to one another to accommodate curvature of the sleeve, wherein the sleeve also comprises resiliently-deformable projections projecting from an inner surface of the wall, the projections being positioned at intervals along the inner surface of said wall, each projection being arranged so that it acts to cushion relative movement between the member and the wall.

2. A sleeve according to claim 1, wherein the projections are integral with the wall.

3. A sleeve according to claim 1, wherein the projections are adhered to a supporting sheet which is adhered to said wall.

4. A sleeve according to claim 1, wherein the projections are resiliently-deformable by being bent out of their unloaded configuration.

5. A sleeve according to claim 4, wherein the projections are plastics monofilaments.

6. A sleeve according to claim 1, wherein the projections are resiliently-deformable by being compressible lengthwise.

7. A sleeve according to claim 1, wherein the projections are uniformly distributed circumferentially of the sleeve.

8. A sleeve according to claim 1, wherein the projections project substantially normally of the inner surface of the wall.

9. A sleeve according to claim 1, wherein at least some of the projections are inclined along the sleeve.

10. A sleeve according to claim 1, wherein the projections project from the inner surface of the wall by at least 10% of the width of the space surrounded by the wall.

* * * * *